No. 893,080. PATENTED JULY 14, 1908.
M. KUETTNER.
CLEANING IMPLEMENT.
APPLICATION FILED MAR. 2, 1908.
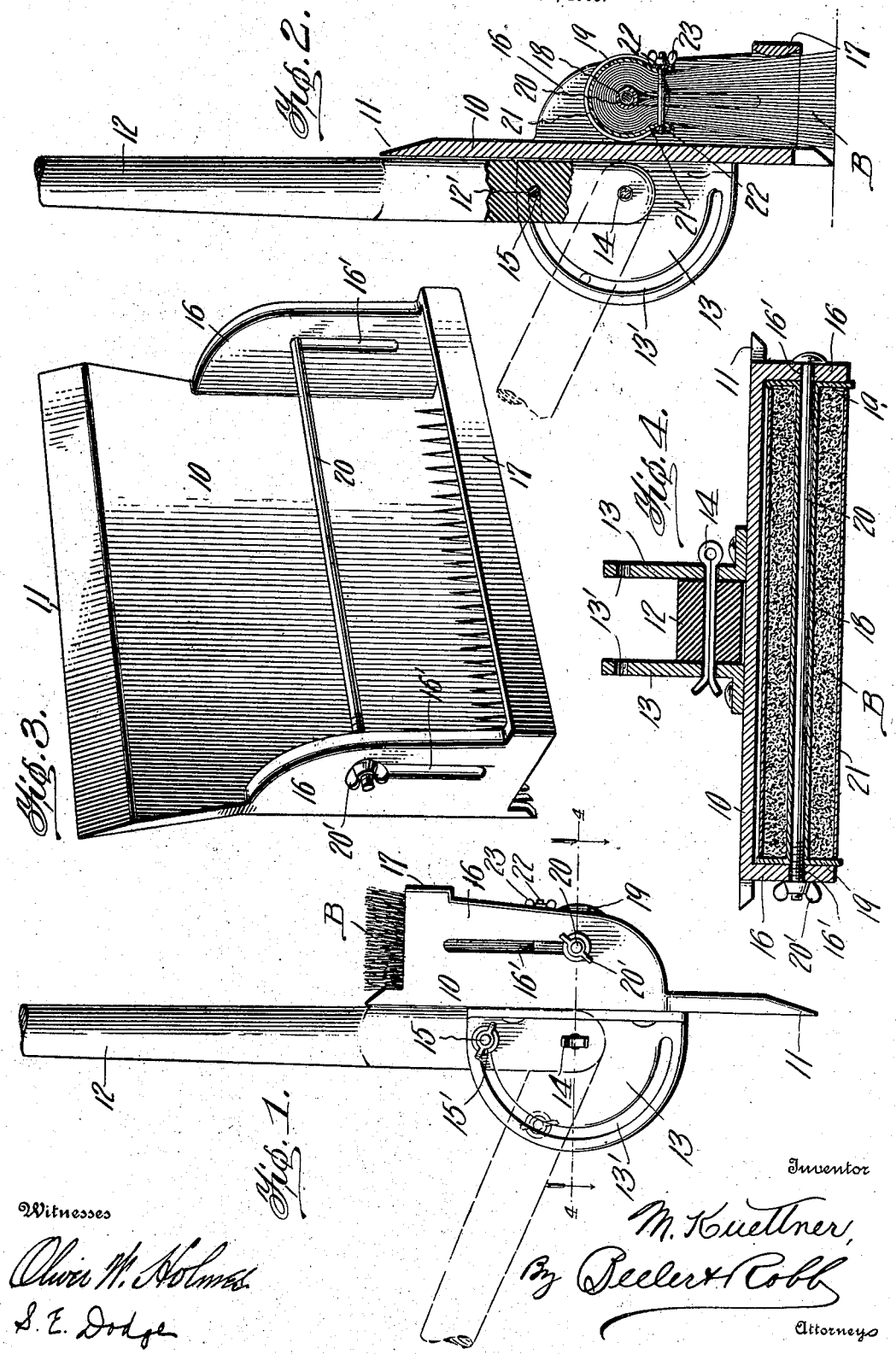

UNITED STATES PATENT OFFICE.

MAX KUETTNER, OF COMFORT, TEXAS.

CLEANING IMPLEMENT.

No. 893,080.  Specification of Letters Patent.  Patented July 14, 1908.

Application filed March 2, 1908. Serial No. 418,852.

*To all whom it may concern:*

Be it known that I, MAX KUETTNER, a subject of the Emperor of Germany, residing at Comfort, in the county of Kendall and State of Texas, have invented certain new and useful Improvements in Cleaning Implements, of which the following is a specification.

This invention is a cleaning implement of novel construction and possessing peculiar advantages.

It is designed primarily for cleaning poultry houses or coops which have low ceilings whereby ready access is prevented for the use of ordinary cleaning appliances. For instance an ordinary hoe commonly employed for scraping the floors is not adapted to reach into the corners of the structure to be cleaned, and a broom having a rigid fixed handle cannot be used in many instances for obvious reasons. Furthermore the implement is useful in many other relations, such as in cutting weeds and grass along garden walks and sweeping the same, removing ice from drinking troughs, and so on.

For a full understanding of the invention and the various details of construction, reference is to be had to the following description and the accompanying drawings, in which, Figure 1 is an end or edge view of the implement showing the handle in position when the device is used as a digger; Fig. 2 is a vertical sectional view, parts being in elevation, showing the implement when used as a broom; Fig. 3 is a detail perspective of parts of the implement to be hereinafter described, and Fig. 4 is a transverse section on the line 4—4 of Fig. 1.

Throughout the following description and on the several figures of the drawings, similar parts are referred to by like reference characters.

The invention in its preferred form includes a main plate or base 10 having a sharp edge 11. On one face of said plate, is attached an operating handle 12, being pivoted between and centrally of a pair of ears 13 attached to said plate by any suitable means, as by riveting. Each of the ears 13 is provided with a semicircular slot 13', the center of curvature of which is the axis of a bolt or cotter 14 which projects through said ears and the end of the handle 12. A bolt 15 having a thumb nut 15' passes through the slots 13' and the hole 12' in the handle, whereby the handle may be locked at any desired angle with relation to the plate 10. When the device is used as a scraper or hoe, the handle may be set at substantially a right angle to the said plate or blade 10. When it is used as a digger, as for instance in chopping ice from walks or digging in the ground, the handle will be set in substantial alinement with the blade and extended from its axis oppositely from the edge 11 of the blade 10.

Connected with the member 10 is a sweeping or brushing attachment, the same being secured thereto by a peculiar device constituting a part of the implement. On each side of the base 10 is a flange 16, the flanges being integral with or rigidly secured to said member 10 and projecting therefrom substantially at right angles on the side of the same opposite from that to which the handle is connected. Each of the flanges 16 is provided with a longitudinal slot 16' substantially parallel with the base plate 10, and the outer ends of the flanges are connected by a crossbar 17 rigidly secured thereto. The broom portion of the device comprises a hollow member 18 having end flanges 19, said member being substantially spool-shaped and being mounted between the flanges 16, and a rod 20 passed through the slots 16' and said hollow member or spool. The rod 20 is provided with a thumb nut 20' by means of which the spool may be locked in any position of adjustment within the limits of the slots 16'.

The brush portion B of the broom is constructed by looping the fibers of the same about the member 18, bringing the free ends of the same in proximity to one another where they are clamped by means of a sheath 21. The sheath is constructed preferably of sheet metal, the edges of which are curved outwardly from each other as indicated at 21', and in each of which curved edges there lies a correspondingly curved bar 22. Suitable fastening devices such as screws or rivets 23 pass through said bars 22, the curved edges 21' of the sheath, and the body of the brush B. The loose ends of the fibers of the brush lie beneath the bar 17, or between the bar 17 and the plate 10 whereby they are securely held in position and protected from abnormal destruction. When the brush is new the spool 18 will be located substantially near the inner ends remote from the bar 17, but as the brush wears away as by use it may be adjusted from time to time toward the bar, just so much of the brush projecting beyond the plate at any time as may be desirable. When the implement is used as a sweeping device, the handle 12 will be set in a position directly opposite from that described when the implement is used as a digger.

It will be understood that the implement may be constructed of any suitable materials and may be made in various sizes according to the requirements and the uses to which it may be applied. The brush B may be made up of any suitable material such as bristles, straws, hickory, wire, or the like. While I have herein set forth the preferred embodiment of the invention, it will be understood that slight modifications in mechanical structure may be made without departing from the spirit of the invention as hereinafter claimed.

Upon referring to Figs. 2 and 3 of the drawings it will be noted that the implement may be employed also in the capacity of a rake. With the handle 12 adjusted so as to constitute the implement as a hoe, or at any other suitable angle, and preferably with the brush B removed the blunt edge, or the edge opposite the sharp edge 11, shown as being supplied with teeth, may be employed for the purposes of crushing clods and leveling and smoothing soil that has been spaded up, or for any of the usual purposes for which a rake may be used.

Having thus described the invention, what is claimed as new, is:

1. The herein described cleaning implement comprising a flat base plate, a handle secured to said plate on one side, a plurality of flanges secured to the other side of the plate, a brush mounted between said flanges, said brush comprising a spool, a set of flexible sweeping elements looped about the spool, and means to secure said elements to the spool, and means to secure the brush to the flanges, as set forth.

2. The combination of a flat plate having a sharp edge, a handle adjustably secured to one face of the plate, a brush associated with the opposite face of the plate and lying parallel thereto, and means for adjusting the brush longitudinally of the plate and securing the same in adjusted position.

3. In combination, a base plate, lateral flanges thereon having openings, a spool extending between said flanges, means passed through the spool and openings in the flanges to secure the spool in place, flexible brush elements looped about the spool and with their free ends lying against one another, a sheath embracing the looped portion of the said elements, means passed through the brush securing the sheath thereto, and means to protect the free ends of the brush elements.

In testimony whereof I affix my signature in presence of two witnesses.

MAX KUETTNER.

Witnesses:
   F. MUERDTE,
   ALFRED SCHMIDT.